United States Patent [19]
Clouse

[11] 3,822,683
[45] July 9, 1974

[54] ROLLER BEARING RETAINING CLIP

[75] Inventor: Jerry A. Clouse, Washington, Ill.

[73] Assignee: Caterpillar Tractor Co., Peoria, Ill.

[22] Filed: Dec. 11, 1972

[21] Appl. No.: 313,697

[52] U.S. Cl. ........... 123/90.5, 74/569, 123/139 AP, 417/539
[51] Int. Cl. ............................................. F01l 1/10
[58] Field of Search............. 123/90.5, 90.48, 90.51, 123/90.6, 90.18, 139 AP; 74/569, 55; 417/539

[56] References Cited
UNITED STATES PATENTS

| 1,802,330 | 4/1931 | Boland.............................. 123/90.5 |
| 2,097,413 | 10/1937 | Hurst et al....................... 417/539 X |
| 2,174,526 | 10/1939 | Parker.......................... 123/139 AP |
| 2,179,354 | 11/1939 | Scott............................. 123/139 AP |
| 2,227,127 | 12/1940 | Dillstrom.................. 123/139 AP X |
| 2,516,775 | 7/1950 | Johansen.................. 123/139 AP X |
| 2,781,868 | 2/1957 | House............................... 74/569 X |
| 3,365,979 | 1/1968 | Ericson................................. 74/569 |

Primary Examiner—Manuel A. Antonakas
Assistant Examiner—D. J. O'Connor
Attorney, Agent, or Firm—Phillips, Moore, Weissenberger, Lempio & Strabala

[57] ABSTRACT

A plunger assembly employed in a fuel injection pump terminates at its lower end at a roller bearing which engages a cam lobe of an engine driven cam shaft. A spring clip has a ring portion and a pair of leg portions extending downwardly therefrom to engage opposite ends of the roller bearing to restrain axial displacement thereof.

15 Claims, 3 Drawing Figures

PATENTED JUL 9 1974 3,822,683

ROLLER BEARING RETAINING CLIP

BACKGROUND OF THE INVENTION

The plunger assembly employed in a conventional fuel injection pump normally terminates at its lower end at a roller bearing. The roller bearing engages a cam lobe of a cam shaft to reciprocate the plunger assembly for fuel pumping purposes. The roller bearing is normally mounted for rotation in aligned bores formed through a bifurcated end of the plunger assembly, requiring close manufacturing tolerances therebetween.

SUMMARY OF THE INVENTION

An object of this invention is to provide an economical and non complex spring clip means for engaging opposite ends of a bearing to restrain axial displacement thereof. The spring clip means is particularly adapted for engaging the axial ends of a roller bearing to restrain axial displacement thereof relative to the plunger assembly of a fuel injection pump.

BRIEF DESCRIPTION OF THE DRAWING

Other objects of this invention will become apparent from the following description and accompanying drawing wherein.

DETAILED DESCRIPTION

Figure 1:
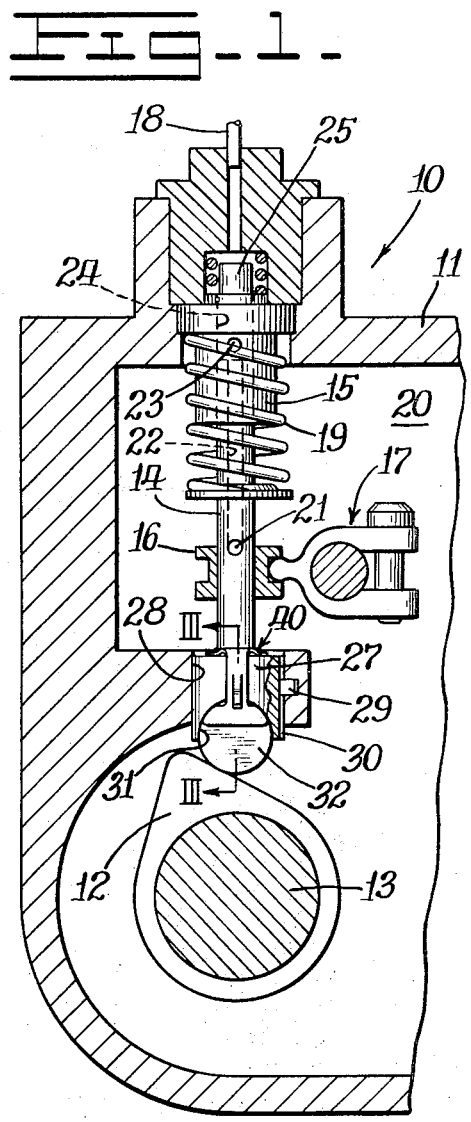
FIG. 1 is a sectional view of a plunger assembly, employed in the fuel injection pump of an internal combustion engine.

FIG. 1 illustrates a fuel injection pump 10 comprising a plunger assembly adapted to reciprocate in a housing 11 by its engagement with a cam lobe 12 of a rotating cam shaft 13. The plunger assembly comprises a rod-like plunger 14 reciprocally mounted in a fuel metering sleeve 15 and an axially spaced metering collar 16. An adjustment mechanism 17 is adapted to position the metering collar axially on the plunger to adjust the quantity of fuel injected into an engine cylinder (not shown) via an outlet conduit 18.

As plunger 14 moves downwardly under the biasing force of compression spring 19, fuel under low pressure in a chamber 20 will enter a lower port 21 which communicates such fuel to a rifle passage 22 formed in the plunger. Low pressure fuel also enters an upper port 23, formed in sleeve 15, to fill an internal cavity 24 thereof. When the plunger is moved upwardly by cam lobe 12, the fuel pressure in cavity 24 increases to a predetermined level to open a check valve 25 whereby pressurized fuel is communicated to outlet conduit 18.

The lower end of plunger 14 is seated against an annular boss 26 formed on the upper end of a cylindrical member 27 of the plunger assembly. The member is reciprocally mounted in a cylindrical bore 28, formed in housing 11. The member is held against rotation by a key 29 which engages a longitudinal slot 30 formed axially therealong.

Figure 2:
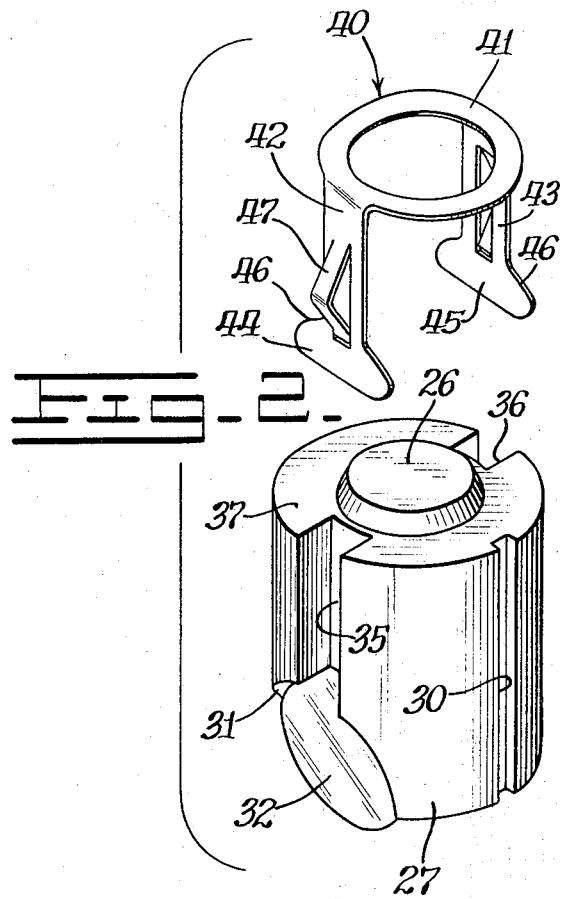
FIG. 2 is an exploded, isometric view of the lower end of the plunger assembly and a spring clip means of this invention, adapted to be mounted theron.
Figure 3:
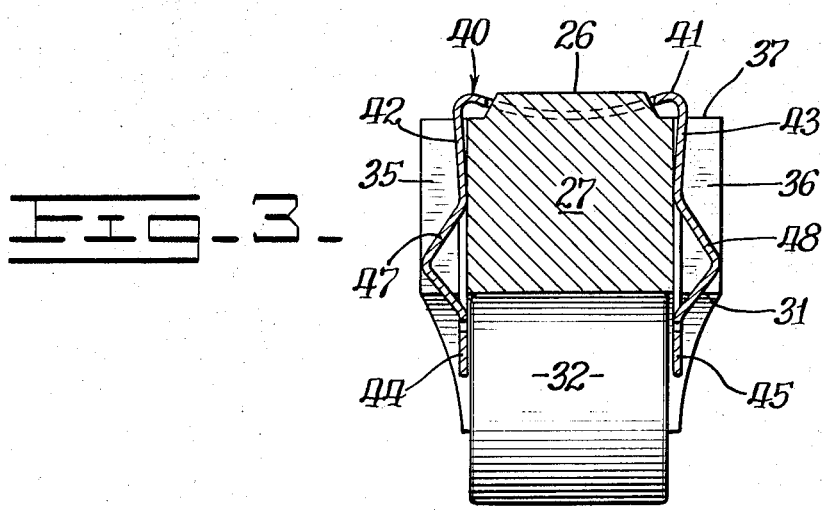
FIG. 3 is a cross-sectional view, taken in the direction of arrows III—III in FIG. 1, illustrating the spring clip means in assembled position.

A semicylindrical bore 31 is formed on the lower end of the member and rotatably mounts a roller bearing 32 therein. The roller bearing continuously engages cam lobe 12, under the biasing force of spring 19. A pair of diametrically opposed slots 35 and 36 (FIGS. 2 and 3) are formed longitudinally along the sides of member 27 and extend between bore 31 as an annular shoulder 37 which encircles the boss 26.

Clip retaining means 40 for restraining axial displacement of roller bearing 32 relative to member 27 comprises a concave ring portion 41 (FIG. 3) which encircles the boss 26. A pair or diametrically opposed leg portions 42 and 43 extend downwardly from the ring portion and are disposed within slots 35 and 36, respectively. The leg portions terminate at their lower ends at foot portions 44 and 45.

Each foot portion has upper, arcuate edges 46 formed thereon to facilitate close seating of the foot portions in bore 31. The parallel edges defining each substantially straight intermediate portion of each leg portion thus intersect upper, arcuate edges 46 of a respective foot portion. Such construction fully accommodates the leg and foot portions on the axial ends of bearing 32 to restrain axial displacement thereof relative to member 27.

The concave shape of ring portion 41 (FIG. 3) aids in resiliently urging foot portions 44 and 45 towards each other to aid in such retention. A pair of generally V-shaped tabs 47 and 48 are punched-out of each of the leg portions to position the apexes thereof radially outwardly beyond the ring portion and substantially coincident with the outside diameter of member 27. Such disposition of the tabs, wherein the apexes thereof lightly engage the vertical sidewalls defining bore 28, further aid in preventing axial displacement of the spring clip means and thus roller 32.

It should be understood that the spring clip means of this invention is adapted for numerous other retention-type applications. For example, the spring clip means could be employed on the end of the plunger of a valve lifter adapted to be reciprocated by a cam shaft to open and close intake and exhaust valves of an internal combustion engine. In addition, bearing 32 could comprise a roller bearing or any other suitable type of follower mechanism.

What is claimed is:

1. An internal combustion engine comprising
 a cam shaft, including at least one cam lobe, rotatably mounted in said engine,
 a plunger assembly, including a member reciprocally mounted in said engine and a separate plunger capable of independent movement relative to said member engaging a top end of said member to reciprocate therewith,
 a bearing mounted on an end of said member and operatively engaging said cam lobe, and
 spring clip means solely mounted on said member and engaging opposite axial ends of said bearing for restraining axial displacement thereof, relative to said member.

2. The internal combustion engine of claim 1 wherein said plunger assembly is included in a fuel injection pump.

3. The internal combustion engine of claim 2 further comprising fuel injection means, including a fuel passage formed in said plunger, for communicating pressurized fuel from said fuel injection pump.

4. The internal combustion engine of claim 2 wherein the top end of said member has an annular boss formed thereon and wherein an end of said plunger is seated against said boss.

5. The internal combustion engine of claim 4 wherein said spring clip means comprises a ring portion encirclingly mounted on said annular boss.

6. The internal combustion engine of claim 1 wherein said member has a pair of diametrically opposed and longitudinally extending slots formed thereon and wherein said spring clip means comprises a pair of leg portions each disposed in a respective one of said slots, each of said leg portions terminating at its lower end at a foot portion positioned closely adjacent to a respective end of said bearing.

7. The internal combustion engine of claim 6 wherein said bearing constitutes a roller bearing mounted in a semicylindrical bore formed on an end of said member and wherein said slots intersect said bore, each of said foot portions comprising upper edges generally conforming to the contour of said bore.

8. The internal combustion engine of claim 6 wherein said spring clip means further comprises a ring portion seated on an upper end of said member, said leg portions extending downwardly from said ring portion.

9. The internal combustion engine of claim 8 wherein said ring portion is slightly concave when received in longitudinal cross section.

10. The internal combustion engine of claim 6 wherein said member is reciprocally mounted in a bore formed in a housing and wherein a generally V-shaped tab is punched out of each of said leg portions to position the apexes thereof substantially coincident with the outside diameter of said member.

11. The internal combustion engine of claim 10 further comprising slot and key means disposed between said housing and said member to prevent relative rotation therebetween.

12. An internal combustion engine comprising
a cam shaft, including at least one cam lobe, rotatably mounted in said engine,
a plunger assembly, including a member reciprocally mounted in said engine and having an annular boss formed thereon,
a bearing mounted on an end of said member and operatively engaging said cam lobe, and
spring clip means comprising a ring portion encirclingly mounted on the annular boss of said member and a pair of leg portions positioned to engage opposite ends of said bearing for restraining axial displacement thereof, relative to said member.

13. An internal combustion engine comprising
a cam shaft, including at least one cam lobe, rotatably mounted in said engine,
a plunger assembly, including a member reciprocally mounted in said engine and having a pair of longitudinally extending slots formed thereon,
a roller bearing mounted in a semi-circular bore formed on an end of said member to intersect said bore, said roller bearing operatively engaging said cam lobe, and
spring clip means mounted on said member and having a pair of leg portions each disposed in a respective one of said slots, each of said leg portions terminating at its lower end at a foot portion, comprising upper edges generally conforming to the contour of said bore, positioned adjacent to opposite ends of said bearing for restraining axial displacement thereof, relative to said member.

14. An internal combustion engine comprising
a cam shaft, including at least one cam lobe, rotatably mounted in said engine,
a plunger assembly, including a member reciprocally mounted in said engine and having a pair of longitudinally extending slots formed thereon,
a bearing mounted on an end of said member and operatively engaging said cam lobe, and
spring clip means having a ring portion seated on an upper end of said member and a downwardly extending pair of leg portions each disposed in a respective one of said slots, each of said leg portions terminating at its lower end at a foot portion positioned closely adjacent to a respective end of said bearing for restraining axial displacement thereof, relative to said member.

15. An internal combustion engine comprising
a cam shaft, including at least one cam lobe, rotatably mounted in said engine,
a plunger assembly, including a member reciprocally mounted in a bore formed in said engine and having a pair of longitudinally extending slots formed thereon,
a bearing mounted on an end of said member and operatively engaging said cam lobe, and
spring clip means mounted on said member and having a pair of leg portions each disposed in a respective one of said slots, each of said leg portions having a generally V-shaped tab punched out of it to position apexes of said tabs substantially coincident with the outside diameter of said member and each leg portion terminating at its lower end at a foot portion positioned adjacent to a respective end of said bearing for restraining axial displacement thereof, relative to said member.

* * * * *